(12) United States Patent
Park

(10) Patent No.: US 10,607,783 B2
(45) Date of Patent: *Mar. 31, 2020

(54) MULTILAYER CAPACITOR INCLUDING LIQUID POCKET

(71) Applicant: SAMSUNG ELECTRO-MECHANICS CO., LTD., Suwon-si, Gyeonggi-do (KR)

(72) Inventor: Byung Hyun Park, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/279,135

(22) Filed: Feb. 19, 2019

(65) Prior Publication Data

US 2020/0043665 A1 Feb. 6, 2020

Related U.S. Application Data

(63) Continuation of application No. 16/143,215, filed on Sep. 26, 2018.

(30) Foreign Application Priority Data

Aug. 1, 2018 (KR) ........................ 10-2018-0089914

(51) Int. Cl.
*H01G 4/30* (2006.01)
*H01G 4/12* (2006.01)
*H01G 4/012* (2006.01)

(52) U.S. Cl.
CPC .............. *H01G 4/30* (2013.01); *H01G 4/1227* (2013.01); *H01G 4/012* (2013.01)

(58) Field of Classification Search
CPC ............ H01G 4/30; H01G 4/12; H01G 4/1227
See application file for complete search history.

(56) References Cited

U.S. PATENT DOCUMENTS

| | | | |
|---|---|---|---|
| 2007/0203014 A1 | 8/2007 | Watanabe | |
| 2008/0068777 A1 | 3/2008 | Takeoka | |
| 2009/0059471 A1 | 3/2009 | Fukuda et al. | |
| 2016/0293331 A1* | 10/2016 | Kitamura | ................ H01G 4/30 |
| 2018/0337002 A1* | 11/2018 | Bultitude | ............... H01G 4/258 |
| 2019/0267189 A1 | 8/2019 | Makino | |

FOREIGN PATENT DOCUMENTS

| | | |
|---|---|---|
| KR | 10-0841506 B1 | 6/2008 |
| KR | 10-0903355 B1 | 6/2009 |
| KR | 10-1021513 B1 | 3/2011 |

OTHER PUBLICATIONS

U.S. Office Action dated Sep. 25, 2019 issued in U.S. Appl. No. 16/143,215.
Korean Office Action dated Nov. 14, 2019 issued in Korean Patent Application No. 10-2018-0089914 (with English translation).

* cited by examiner

*Primary Examiner* — Eric W Thomas
(74) *Attorney, Agent, or Firm* — Morgan, Lewis & Bockius LLP

(57) ABSTRACT

A multilayer capacitor includes a body in which a plurality of internal electrodes are stacked, including a ceramic sintered body; and external electrodes disposed on an external surface of the body and electrically connected to the internal electrodes. The ceramic sintered body includes a liquid pocket.

13 Claims, 4 Drawing Sheets

A-A'

B-B'

MULTILAYER CAPACITOR INCLUDING LIQUID POCKET

CROSS-REFERENCE

This application is the continuation application of U.S. patent application Ser. No. 16/143,215 filed Sep. 26, 2018, which claims the benefit of Korean Application No. 10-2018-0089914 filed on Aug. 1, 2018, the entire contents of each are hereby incorporated by reference.

BACKGROUND

1. Field

The present disclosure relates to a multilayer capacitor.

2. Description of Related Art

Multilayer capacitors have been used in various electronic components, and recently, in accordance with the digitalization of various functions of technical fields requiring high reliability and an increase in demand, a high degree of reliability has been required in such a multilayer capacitor.

In order to improve the reliability of a multilayer capacitor, there is a need to secure structural stability. To this end, defects in a ceramic body, internal electrodes, and the like, constituting the multilayer capacitor, should be significantly decreased.

A necessity for improving reliability of the multilayer capacitor has been further increased in accordance with miniaturization of a device. There has been an attempt to develop various technologies for decreasing a thickness of internal electrodes or dielectric layers or improving dispersibility of an additive in the art.

SUMMARY

An aspect of the present disclosure may provide a multilayer capacitor of which reliability is improved by controlling sintering properties, a grain size, and the like, of a ceramic sintered body forming a body.

According to an aspect of the present disclosure, a multilayer capacitor may include a body in which a plurality of internal electrodes are stacked, including a ceramic sintered body; and external electrodes disposed on an external surface of the body and electrically connected to the internal electrodes. The ceramic sintered body includes a liquid pocket.

The liquid pocket may be disposed at a grain boundary in the ceramic sintered body.

The liquid pocket may be disposed at a multiple grain boundary by at least three grains adjacent to each other among a plurality of grains included in the ceramic sintered body.

Among a plurality of grains included in the ceramic sintered body, a grain adjacent to the liquid pocket may have a smaller size than that of a grain not adjacent to the liquid pocket.

Among the plurality of grains included in the ceramic sintered body, an average size of the grains adjacent to the liquid pocket may be smaller than an average size of the grains that are not adjacent to the liquid pocket.

Among the plurality of grains included in the ceramic sintered body, an average size of the grains adjacent to the liquid pocket may be smaller than a half of the average size of the grains that are not adjacent to the liquid pocket.

A diameter of the liquid pocket may be within a range from 10 to 50 nm.

An average diameter of the liquid pocket may be within a range from 10 to 50 nm.

The average number of liquid pockets per 1 $\mu m^2$ area of the ceramic sintered body based on a cross section maybe within a range from 1 to 10.

The average number of liquid pockets per 1 $\mu m^2$ area of the ceramic sintered body based on a cross section maybe within a range from greater than 2 to 10.

The ceramic sintered body may further include a void.

The void may have a larger size than that of the liquid pocket.

The void may have a size of 0.1 to 10 $\mu m$ based on a cross section.

The ceramic sintered body may be formed of a BT based ceramic material and contain at least one of Si or Al ingredients as addition ingredients.

An average interval between internal electrodes adjacent to each other among the plurality of internal electrodes may be 0.4 $\mu m$ or less.

An average thickness of the plurality of internal electrodes may be 0.4 $\mu m$ or less.

The liquid pocket maybe disposed in a dielectric layer separating adjacent internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
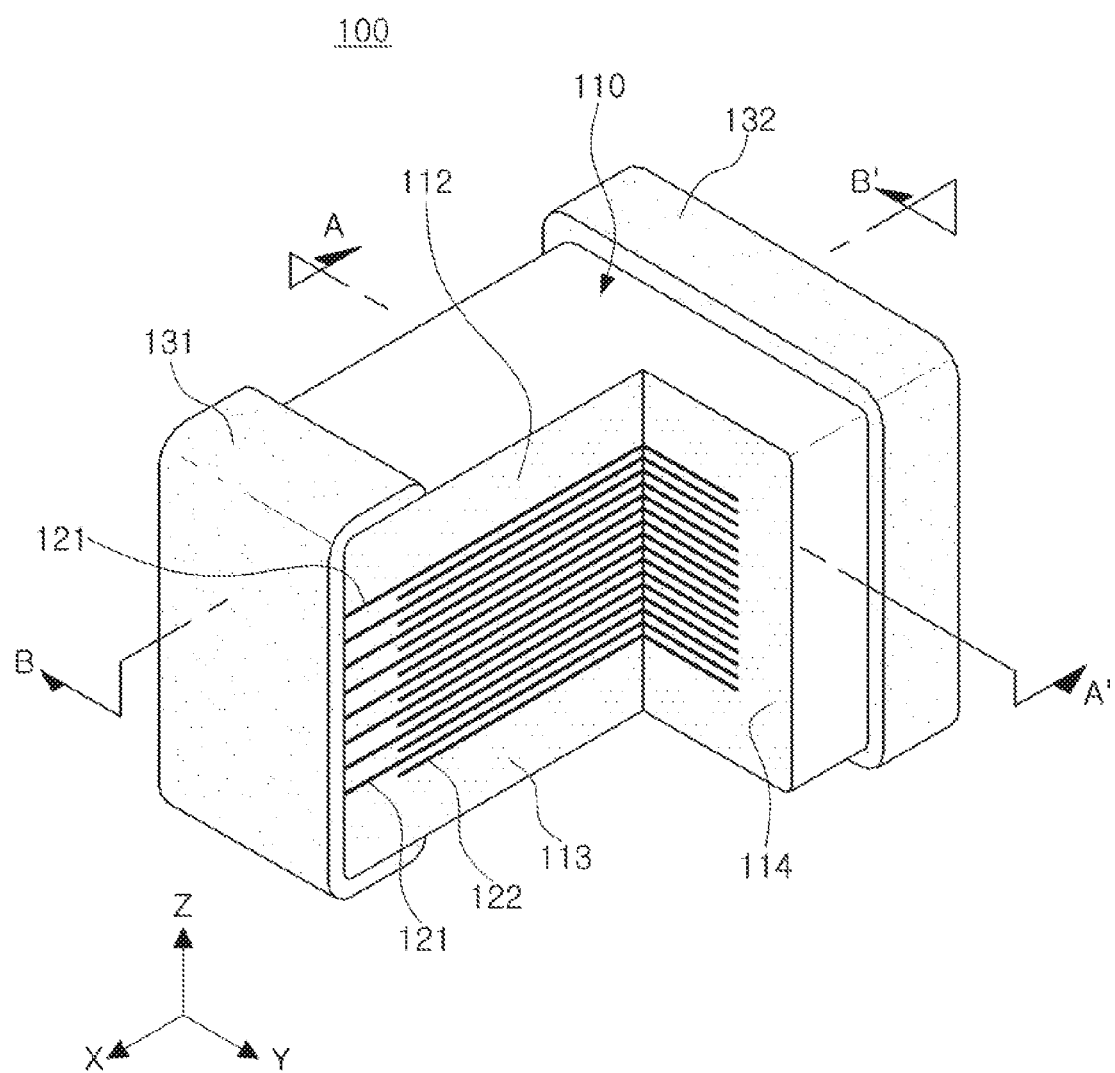
FIG. 1 is a partially cut-away perspective view schematically illustrating a multilayer capacitor according to an exemplary embodiment in the present disclosure.
Figure 2:
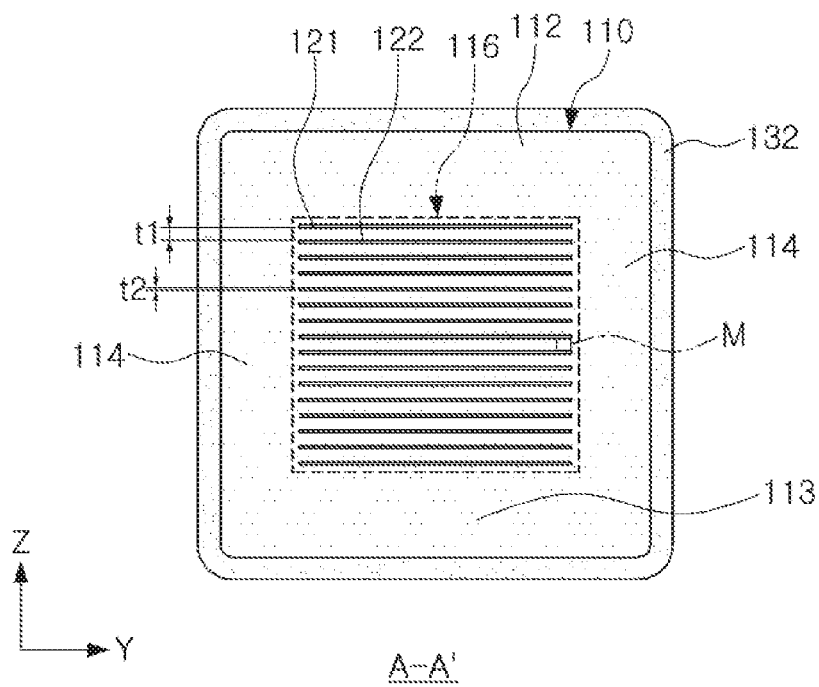
FIGS. 2 and 3, which are schematic cross-sectional views of the multilayer capacitor of FIG. 1, are cross-sectional views taken along lines A-A' and B-B' of FIG. 1, respectively.
Figure 3:
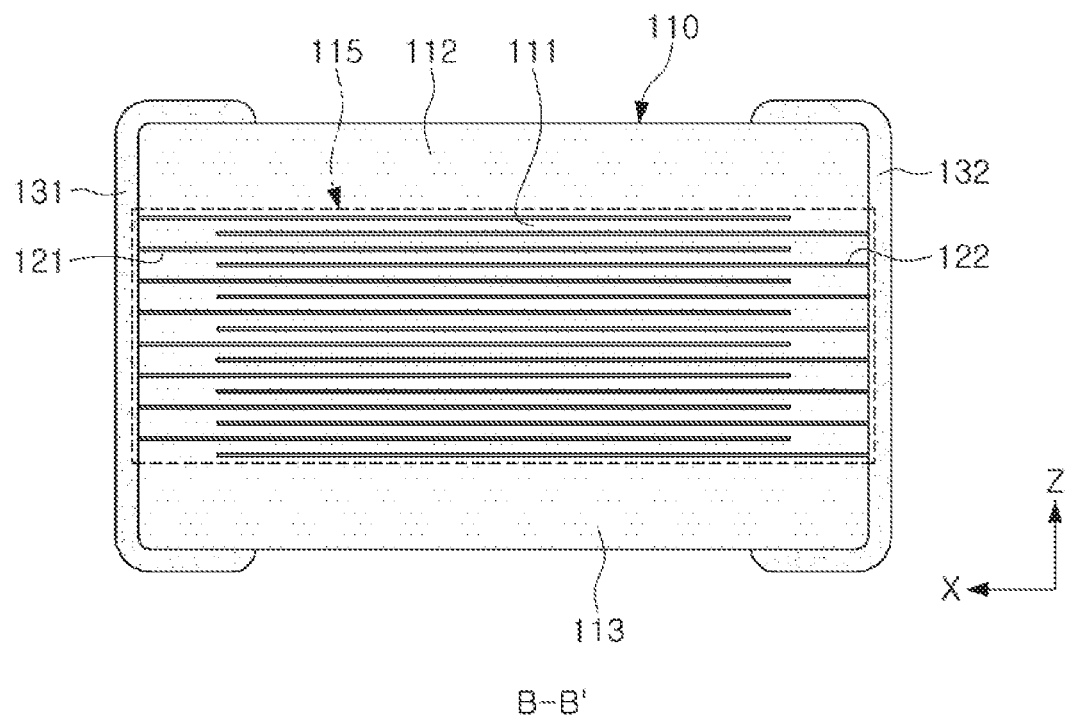
Figure 4:
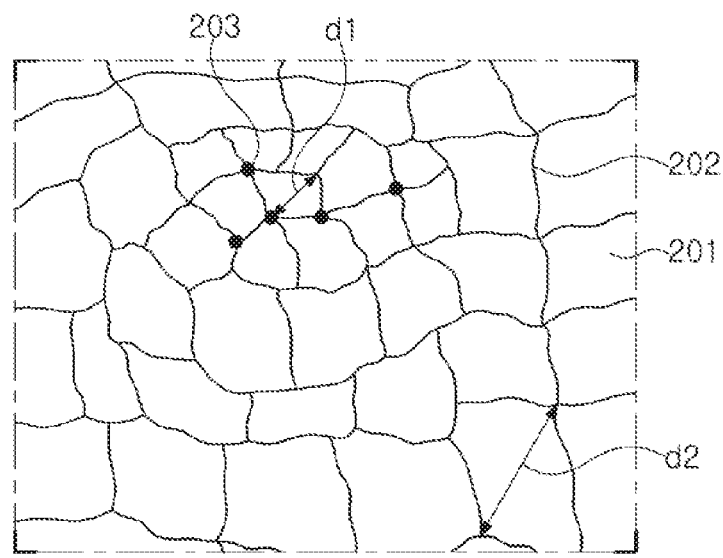
FIG. 4 is an enlarged view illustrating some region (M region) of a dielectric layer of a body of FIG. 2.

FIG. 1 is a partially cut-away perspective view schematically illustrating a multilayer capacitor according to an exemplary embodiment in the present disclosure. FIGS. 2 and 3, which are schematic cross-sectional views of the multilayer capacitor of FIG. 1, are cross-sectional views taken along lines A-A' and B-B' of FIG. 1, respectively. FIG. 4 is an enlarged view illustrating some region (M region) of a dielectric layer of a body of FIG. 2.

Referring to FIGS. 1 through 4, a multilayer capacitor 100 according to the present exemplary embodiment may have a structure including a body 110 in which a plurality of internal electrodes 121 and 122 are stacked, including a ceramic sintered body, and external electrodes 131 and 132. In this case, the body 110 may include a liquid pocket 203 formed in the ceramic sintered body.

A plurality of dielectric layers 111 may be stacked in the body, and the body 110 may be obtained by stacking and sintering a plurality of green sheets as described below. The plurality of dielectric layers may be integrated with each other by the sintering as described above. A shape and dimensions of the body 110 and the number of stacked dielectric layers 111 are not limited to those illustrated in the present exemplary embodiment. For example, as illustrated in FIG. 1, the body 110 may have a rectangular parallelepiped shape. Even though the multilayer capacitor 100 according to the present embodiment has a relatively small size, reliability thereof may be excellent. More specifically, the dielectric layer 111 may have excellent insulation properties under a harsh condition. A thickness t1 of the dielectric layer 111, that is, an average interval between internal electrodes adjacent to each other among the plurality of internal electrodes 121 and 122 may be 0.4 μm or less.

The dielectric layer 111 included in the body 110 may contain a ceramic material having high permittivity. For example, the dielectric layer 111 may contain a barium titanate ($BaTiO_3$) based ceramic material, but another material known in the art may also be used as long as sufficient capacitance may be obtained. If necessary, the dielectric layer 111 may further contain an additive, an organic solvent, a plasticizer, a binder, a dispersant, and the like, in addition to the above-mentioned ceramic material corresponding to a main ingredient. Here, examples of the additive may include metal ingredients, and these metal ingredients may be added in a form of metal oxides in a manufacturing process. Examples of the metal oxide additive as described above may include at least one material of $MnO_2$, $Dy_2O_3$, BaO, MgO, $Al_2O_3$, $SiO_2$, $Cr_2O_3$, and $CaCO_3$. In this case, elements forming a liquid phase during the sintering may be added in order to effectively form the liquid pocket 203 in the ceramic sintered body as described below. For example, the ceramic sintered body may contain a Ba ingredient, a Si ingredient, an Al ingredient, and the like, as addition ingredients.

Meanwhile, the body 110 may include an active region 115 forming capacitance by the internal electrodes 121 and 122, and cover regions 112 and 113 disposed on both sides of the active region 115 in a thickness direction, that is, upper and lower surfaces of the active region 115 in FIGS. 1 through 3. Here, the active region 115 may include a capacitance region 116 in which the internal electrodes 121 and 122 are disposed and a side margin region 114 in an outer portion in which the internal electrodes 121 and 122 are not disposed.

The cover regions 112 and 113 may serve to prevent the first and second internal electrodes 121 and 122 from being damaged by physical or chemical stress, and have substantially the same material and configuration as those of the dielectric layer 111 of the active region 115 except that the internal electrodes 121 and 122 are not included. In this case, the cover regions 112 and 113 may be obtained together by stacking and sintering of green sheets. The cover regions 112 and 113 as described above may be implemented in a sintered form by stacking one or two or more green sheets on the upper and lower surfaces of the active region 115.

The internal electrodes 121 and 122 may be connected to different external electrodes 131 and 132 from each other to have different polarities from each other at the time of driving. As described below, the internal electrodes 121 and 122 may be obtained by printing and sintering a paste containing a conductive metal on one surface of a ceramic green sheet at a predetermined thickness. In this case, the internal electrodes 121 and 122 may be formed to be alternately exposed to both end surfaces of the body 110 in a stacking direction as illustrated in FIGS. 1 and 3, and may be electrically insulated from each other by each of the dielectric layers 111 interposed therebetween. Examples of a main ingredient constituting the internal electrodes 121 and 122 may include nickel (Ni), copper (Cu), palladium (Pd), silver (Ag), and the like, and alloys thereof may also be used. The plurality of internal electrodes 121 and 122 may become thinned so as to be suitable for miniaturization of the multilayer capacitor 100. For example, an average thickness t2 thereof may be 0.4 μm or less.

The external electrodes 131 and 132 may be formed on an external surface of the body 110 and may be electrically connected to the internal electrodes 121 and 122, respectively. The external electrodes 131 and 132 may be formed by a method of preparing a material containing a conductive metal in a form of paste and applying the paste on the body 110, and examples of the conductive metal may include nickel (Ni), copper (Cu), palladium (Pd), gold (Au), or alloys thereof.

Referring to the enlarged view of FIG. 4, in the present exemplary embodiment, the ceramic sintered body forming the body 110 may contain a plurality of grains 201 and grain boundaries 202 formed by the plurality of grains 201, and the liquid pocket 203 may be formed in the grain boundary 202. More specifically, as illustrated in FIG. 4, the liquid pocket 203 may be formed at a multiple grain boundary by at least three grains 201 adjacent to each other among the plurality of grains 201, for example, a triple-point grain boundary. However, although FIG. 4 illustrates some region M of the dielectric layer 111, other regions of the body 110, that is, the cover regions 112 and 113 and the side margin region 114 may have a structure similar thereto.

The liquid pocket 203 may be formed between particles during sintering the dielectric layer 111, and thus, the liquid pocket 203 may have an effect of suppressing grain growth of particles around the liquid pocket 203. More specifically, in a case of mixing and sintering BT based ceramic particles, metal oxide additives, and the like, elements forming a liquid phase, for example, Ba, Si, Al, and the like, may form the liquid pocket 203 in a region between the particles. According to the study by the present inventors, a majority of the liquid pockets 203 as described above may be formed in the triple-point grain boundary, and remain after the sintering by appropriately controlling sintering conditions.

The liquid pocket 203 formed in the triple-point grain boundary may serve to suppress additional grain growth while grain growth of the grains 201 proceeds after densification is completed, such that among the plurality of grains 201, a grain adjacent to the liquid pocket 203 may have a smaller size than that of a grain not adjacent to the liquid pocket 203. Therefore, an average size d1 of grains 201 adjacent to the liquid pocket 203 among the plurality of grains 201 may be smaller than an average size d2 of grains 201 that are not adjacent to the liquid pocket 203. Further, the average size d1 of the grains 201 adjacent to the liquid pocket 203 among the plurality of grains 201 may be smaller than a half of the average size d2 of the grains 201 that are not adjacent to the liquid pocket 203. Here, the sizes d1 and d2 of the grains may be defined as circle-equivalent diameters based on a cross section.

The number and size of liquid pockets 203 may be adjusted depending on a material or a sintering condition of the ceramic sintered body, or the like. For example, a diameter of the liquid pocket 203 may be within a range from 10 to 50 nm. Moreover, an average diameter of the liquid pocket 203 may be within a range from 10 to 50 nm. Further, in view of an occurrence frequency of the liquid pocket 203, the number of liquid pockets 203 per 1 μm² area of the ceramic sintered body based on the cross section may be within a range from 1 to 10.

As described above, as fine grains 201 may be distributed due to the suppression of grain growth around the liquid pocket 203, withstand voltage properties and reliability of the dielectric layer 111 may be improved. Here, reliability of the dielectric layer 111 may mean high-temperature acceleration and moisture resistance properties, and the like. Describing the principle that the liquid pocket 203 remains during the sintering, first, in a green sheet for a dielectric layer, an additive and a liquid phase are consumed in accordance with an increase in sintering temperature, and growth and densification of particles proceed. For example, grain growth and densification of raw materials of the dielectric layer that are changed into liquid phases in a secondary calcination environment of about 800 to 900 degrees proceed. To this end, an additive containing an ingredient advantageous for forming a liquid phase such as Si, Al, or Ba may be used. Further, while densification of the particles proceeds, the liquid phase may remain in some regions such as boundaries between the particles, that is, the above-mentioned triple-point grain boundary, and the like, such that the liquid phase may remain in a form of the liquid pocket 203 in a final product. To this end, the sintering may be stopped in a state in which the liquid pocket 203 remains after the densification proceeds. In detail, a sintering temperature which is about 1110° C. may be lowered, and a hydrogen concentration may be adjusted.

As described above, the liquid pocket 203 remaining in the dielectric layer 111 may be detected during the sintering, and formed of a B-Si-O ingredient . In order to detect the liquid pocket 203 after the multilayer capacitor 100 is implemented, a surface of the dielectric layer may be etched for analyzing a microstructure. In this process, the liquid pocket 203 may be removed. Even though the liquid pocket 203 is removed, since a shape thereof may be different from a void, it may be confirmed through electron microscopy analysis that the liquid pocket 203 was present.

Figure 5:
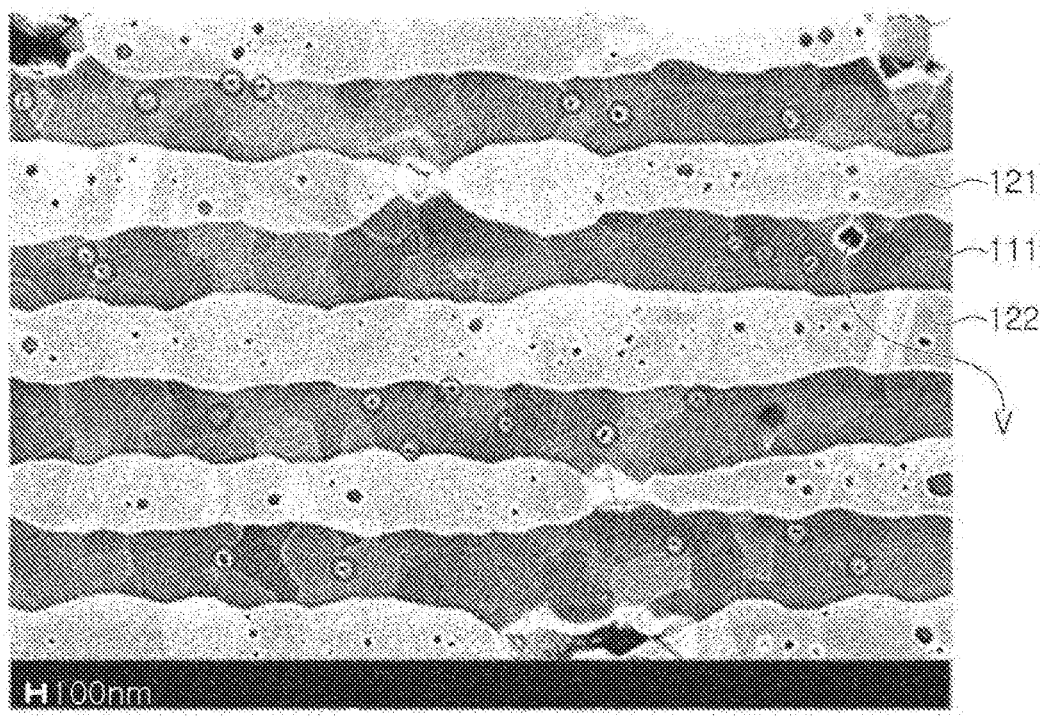
FIGS. 5 and 6 are enlarged electron microscope images illustrating dielectric layers and internal electrodes of multilayer capacitors obtained according to Inventive Example.
Figure 6:
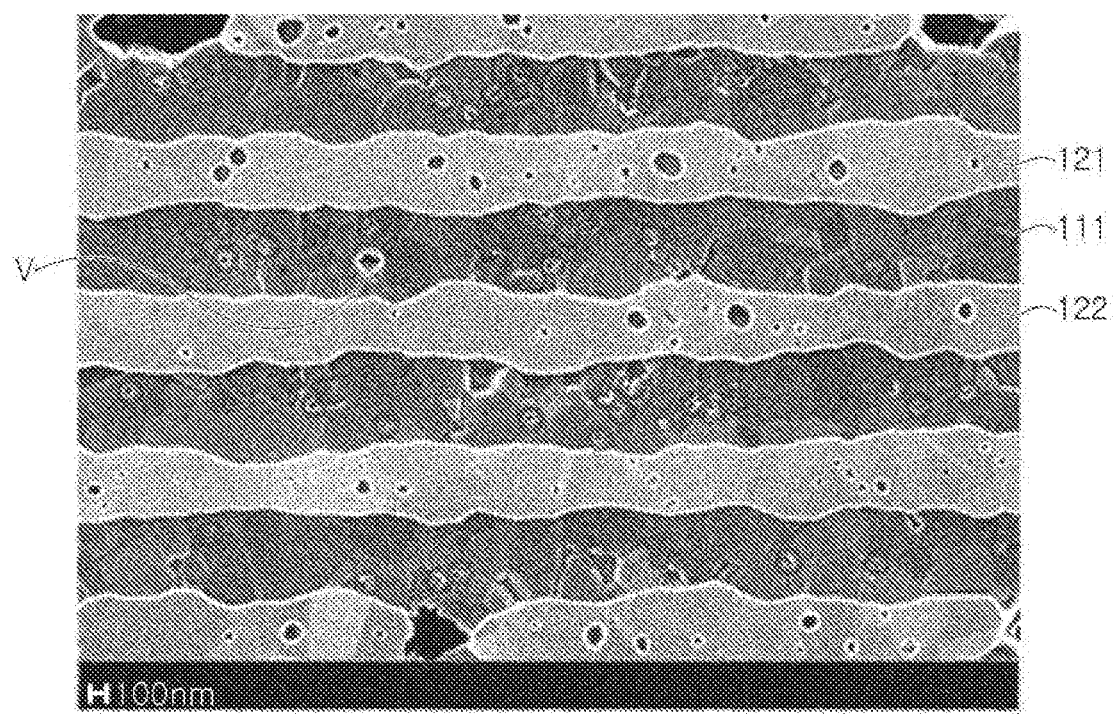

FIGS. 5 and 6 are enlarged electron microscope images illustrating dielectric layers and internal electrodes of multilayer capacitors obtained according to Inventive Examples. In a dielectric layer 111 included in a body, an etching region in which a liquid pocket 203 was present was observed in a ceramic sintered body, and the corresponding region was indicated by a circle in FIGS . 5 and 6. Further, the ceramic sintered body may contain a void (V), and it was confirmed that in general, a size of the void V was larger than that of the liquid pocket 203. Based on a cross section, the size of the void V may be 0.1 to 10 μm. Further, it was confirmed that a reflection region (a white region in an edge of the void in FIGS. 5 and 6) was found in the edge of the void V due to morphological properties thereof at the time of capturing an image with an electron microscope, such that the void V and a site in which the liquid pocket 203 was present can be effectively distinguished from each other.

Meanwhile, ceramic sintered bodies illustrated in FIGS. 5 and 6 were obtained under different conditions from each other. In FIG. 5, about 25 liquid pockets per 20 μm$^2$ were observed, and in FIG. 6, about 42 liquid pockets per 20 μm$^2$ were observed. Hence, the number of liquid pockets 203 per 1 μm$^2$ area of the ceramic sintered body of FIG. 6 based on the cross section may be greater than 2. Samples of FIGS. 5 and 6 were obtained using the same BT based ceramic particles as a raw material, and only additive ingredients were partially different from each other. In the sample of FIG. 6, an Al additive advantageous for forming a liquid phase was used. Therefore, in the sample of FIG. 6, the Al ingredient was uniformly distributed in grains. Further, the samples of FIGS. 5 and 6 were sintered by the same method, and a sintering temperature was set to about 1120° C.

As a result of performing a reliability test on the samples in which occurrence frequencies of the liquid pocket were different from each other as described above, reliability was excellent in both the samples as compared to the related art. However, the sample of FIG. 6 having a larger number of liquid pockets exhibited further improved reliability. In this case, a case in which resistance of the dielectric layer was decreased to about 10 to $10^5\Omega$ with the passage of time under harsh conditions in the reliability test was considered as fail. As described above, it may be appreciated that when a relatively large number of liquid pockets are present, reliability of the corresponding sample is excellent. The reason may be that grain growth is suppressed around the liquid pocket as described above, such that the grain becomes atomized.

As set forth above, according to exemplary embodiment in the present disclosure, reliability of the multilayer capacitor may be improved by controlling the sintering properties, the grain size, and the like of the ceramic sintered body forming the body.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body in which a plurality of internal electrodes are stacked, including a ceramic sintered body; and
external electrodes disposed on an external surface of the body and electrically connected to the internal electrodes,
wherein the ceramic sintered body includes a liquid pocket, and
wherein a diameter of the liquid pocket is within a range from 10 to 50 nm.

2. The multilayer capacitor of claim 1, wherein the liquid pocket is disposed at a grain boundary in the ceramic sintered body.

3. The multilayer capacitor of claim 2, wherein the liquid pocket is disposed at a multiple grain boundary by at least three grains adjacent to each other among a plurality of grains included in the ceramic sintered body.

4. The multilayer capacitor of claim 2, wherein among a plurality of grains included in the ceramic sintered body, a grain adjacent to the liquid pocket has a smaller size than that of a grain not adjacent to the liquid pocket.

5. The multilayer capacitor of claim 4, wherein among the plurality of grains included in the ceramic sintered body, an average size of the grains adjacent to the liquid pocket is smaller than an average size of the grains that are not adjacent to the liquid pocket.

6. The multilayer capacitor of claim 1, wherein the ceramic sintered body is formed of a BT based ceramic material, and contains at least one of Si or Al ingredients as addition ingredients.

7. The multilayer capacitor of claim 1, wherein an average interval between internal electrodes adjacent to each other among the plurality of internal electrodes is 0.4 μm or less.

8. The multilayer capacitor of claim 1, wherein an average thickness of the plurality of internal electrodes is 0.4 μm or less.

9. The multilayer capacitor of claim 1, wherein the liquid pocket is disposed in a dielectric layer separating adjacent internal electrodes.

10. A multilayer capacitor of comprising:
a body in which a plurality of internal electrodes are stacked, including a ceramic sintered body; and
external electrodes disposed on an external surface of the body and electrically connected to the internal electrodes,
wherein the ceramic sintered body includes a liquid pocket, and
wherein an average diameter of the liquid pocket is within a range from 10 to 50 nm.

11. The multilayer capacitor of claim 1, wherein the ceramic sintered body further includes a void.

12. The multilayer capacitor of claim 11, wherein the void has a larger size than that of the liquid pocket.

13. The multilayer capacitor of claim 11, wherein the void has a size of 0.1 to 10 μm based on a cross section.

* * * * *